Patented Aug. 23, 1932

1,873,533

UNITED STATES PATENT OFFICE

GÉRALD BONHÔTE, OF BASEL, SWITZERLAND, ASSIGNOR TO THE FIRM SOCIETY OF CHEMICAL INDUSTRY IN BASLE, OF BASEL, SWITZERLAND

AZO-DYESTUFFS AND PROCESS OF MAKING SAME

No Drawing. Application filed October 24, 1931, Serial No. 570,981, and in Switzerland November 15, 1930.

The present invention relates to the manufacture of new azo-dyestuffs. It comprises the process of making these dyestuffs, as well as the new dyestuffs themselves.

According to this process valuable new dyestuffs are made when an arylide of 2:3-hydroxynaphthoic acid of the general formula

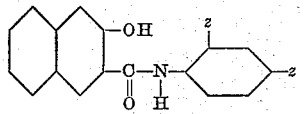

wherein $z$ in one case stands for a substituent from a group of substituents comprising alkyl and alkoxy, and in the other case for hydrogen or a substituent of the just defined group, is coupled with a diazotized 2-amino-1:1'-diphenylether of the general formula

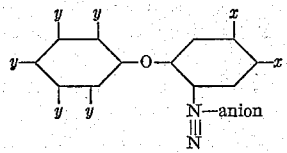

wherein of the five $y$'s three stand for hydrogen atoms, one for a substituent from a group of substituents consisting of alkyl, alkoxy and halogen, and one for a hydrogen atom or a substituent of the above defined group, and wherein further one of the two $x$'s stands for a halogen atom, and the other for a halogen atom or a hydrogen atom. Vivid scarlet to blue-red dyestuffs are produced. These tints are also obtained when the dyestuff is produced on the fiber, and they are characterized by excellent properties of fastness, particularly to chlorine, keir-boiling and light.

The new products thus correspond to the general formula

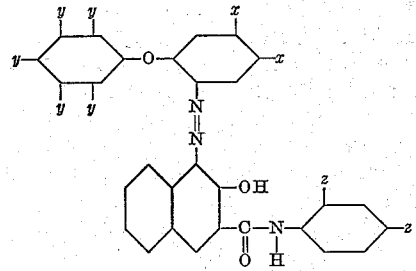

in which the $y$'s, $x$'s and $z$'s have the above explained significations. In organic solvents, such as chlorinated aromatic hydrocarbons, e.g. chlorobenzene or chloronaphthalene they dissolve to yellow-red to blue-red solutions.

The components to be diazotized can be obtained, for example, by reduction of the condensation products obtainable from compounds such as 2-nitro-1:4-dichlorobenzene, 1-nitro-2:4-dichlorobenzene, 1:2-dinitro-5-chlorobenzene, 2-nitro-1:4-dibromobenzene, 1:2-dichloro-4:5-dinitrobenzene, or the like, with nucleal substitution products of phenol, such as ortho-, para- or meta-cresol, xylenols, ortho-, para- or meta-chloro- or bromophenol, chlorocresols, dichlorophenols, hydroquinone-mono-alkyl-ethers, guaiacol, chloroguaiacol, etc.

The following examples illustrate the invention, the parts being by weight:—

Example 1

23.1 parts of 4-chloro-2-amino-4'-methyl-1:1'-diphenylether are diazotized as usual, and the product is introduced into a solution of 27.7 parts of 2:3-hydroxynaphthoic acid-ortho-toluidide, 60 parts of caustic soda solution of 30 per cent. strength and 15 parts of calcined sodium carbonate in 2,000 parts of water. The dyestuff is precipitated immediately. The red precipitate is filtered, washed and dried.

Example 2

Cotton yarn is impregnated with a grounding liquor made by dissolving 7 grams of ortho-anisidide of 2:3-hydroxynaphthoic acid in 300 cc. of hot water with addition of 14 cc. of caustic soda solution of 30 per cent. strength and 10 cc. of Turkey red oil, the whole being diluted to 1 liter. The yarn is then wound off and developed in a solution neutralized by means of sodium acetate containing 4 grams of diazotized 4:4'-dichloro-2-aminodiphenylether per liter. A red tint is produced which is of excellent properties of fastness.

A scarlet-red shade is obtained with 4:2'-dichloro-2-aminodiphenylether.

In this example, 2:3-hydroxynaphthoic acid-4-chloro-2-anisidide may be substituted for the 2:3-hydroxynaphthoic acid-ortho-anisidide, whereby there is obtained a red tint of equally excellent properties of fastness.

*Example 3*

The material to be printed is treated in the Foulard machine with an alkaline solution containing per liter 12 grams of the condensation product from 2:3-hydroxynaphthoic acid and 2-aminohydroquinonedimethylether. When dry, the material is printed with a printing color, which contains per kilo 8 grams of diazotized 4-chloro-2-amino-4'-methyl-1:1'-diphenylether. The deep, pure red dyeing develops very quickly and is remarkably fast.

The following table shows the shades of some other dyestuffs which can be made according to the present invention:—

| | | |
|---|---|---|
| 4:4'-dichloramino-diphenylether | + ortho-anisidide of 2:3-hydroxynaphthoic acid | Red |
| 4:4'- Do. | + para-phenetidide of 2:3-hydroxynaphthoic acid | Scarlet |
| 4:4'- Do. | + para-toluidide of 2:3-hydroxynaphthoic acid | Do. |
| 4:2'- Do. | + Do. | Yellow scarlet |
| 4:2'- Do. | + para-phenetidide of 2:3-hydroxynaphthoic acid | Scarlet |
| 4-chloro-4'-methoxy-2-amino-diphenylether | + ortho-anisidide of 2:3-hydroxynaphthoic acid | Blue-red |
| Do. | + para-anisidide of 2:3-hydroxynaphthoic acid | Bluish-red |
| Do. | + para-phenetidide of 2:3-hydroxynaphthoic acid | Do. |
| 4-chloro-4'-ethoxy-2-amino-diphenylether | + para-anisidide of 2:3-hydroxynaphthoic acid | Do. |
| 4-chloro-4'-methyl-2-amino-diphenylether | + para-phenetidide of 2:3-hydroxynaphthoic acid | Red |
| 4:4'-dichloramino-diphenylether | + 4-chloro-2-anisidide of 2:3-hydroxynaphthoic acid | Do. |
| 4-chloro-4'-methyl-2-amino-diphenylether | + 2:4-dimethoxyanilide of 2:3-hydroxynaphthoic acid | Bluish-red |

If these dyestuffs are to be produced on wool it is advantageous to work according to the particulars of British Patent No. 310,758.

What I claim is:—

1. As new products the azo-dyestuffs of the general formula

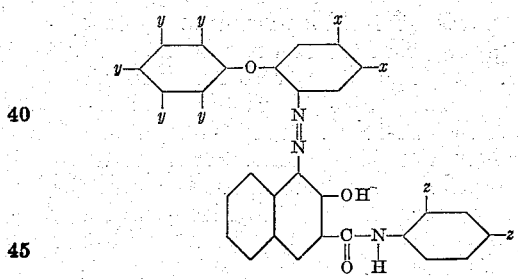

in which of the five $y$'s three stand for hydrogen atoms, one for a substituent from a group of substituents consisting of alkyl, alkoxy and halogen, and one for a hydrogen atom or a substituent of the just defined group, in which further $x$ in one case stands for a halogen atom, and in the other case for a halogen atom or a hydrogen atom, and finally in which $z$ in one case stands for a substituent from a group of substituents consisting of alkyl and alkoxy, and in the other case for a substituent of the just defined group or for a hydrogen atom, which products are red to dark red powders, dissolve in liquid chlorinated aromatic hydrocarbons to red solutions, and yield vivid scarlet red to blue red tints when produced on the fibre, which combine purity with an excellent fastness to chlorine, keir-boiling and light.

2. As new products the azo-dyestuffs of the general formula

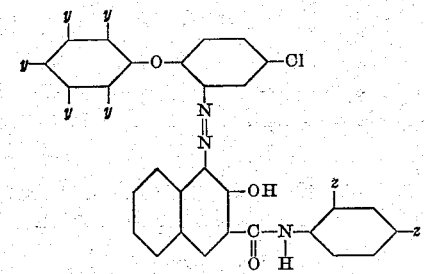

in which of the five $y$'s three stand for hydrogen atoms, one for a substituent from a group of substituents consisting of alkyl, alkoxy and halogen, and one for a hydrogen atom or a substituent of the just defined group, and in which $z$ in one cases stands for a substituent from a group of substituents consisting of alkyl and alkoxy, and in the other case for a substituent of the just defined group or for a hydrogen atom, which products are red to dark red powders, dissolve in liquid chlorinated aromatic hydrocarbons to red solutions, and yield vivid scarlet red to blue red tints when produced on the fibre, which combine purity with an excellent fastness to chlorine, keir-boiling and light.

3. As new products the azo-dyestuffs of the general formula

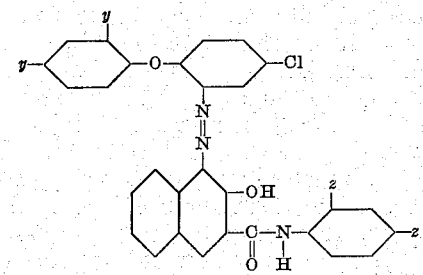

in which of the two $y$'s one stands for a substituent from a group of substituents consisting of alkyl or alkoxy and halogen, and one for a hydrogen atom or a substituent of the just defined group, and in which $z$ in one case stands for a substituent from a group of substituents consisting of alkyl and alkoxy, and in the other case for a substituent of the just defined group or for a hydrogen atom, which products are red to dark red powders, dissolve in liquid chlorinated aromatic hydrocarbons to red solutions, and yield vivid scarlet red to blue red tints when produced on the fibre, which combine purity with an excellent fastness to chlorine, keir-boiling and light.

4. As a new product the azo-dyestuff of the formula

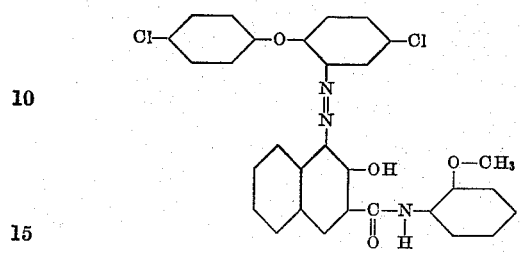

which product is a red powder, dissolves in chlorobenzene to a red solution, and yields, when produced on the fibre, vivid pure red tints of an excellent fastness to chlorine, keir-boiling and light.

5. As new products the azo-dyestuffs of the general formula

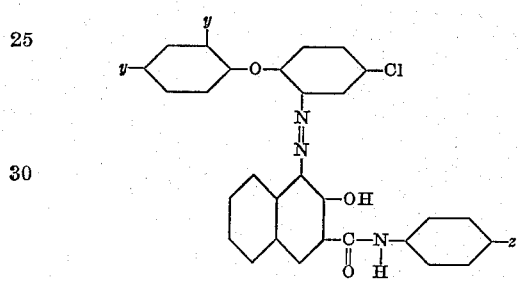

in which of the two $y$'s one stands for a substituent from a group of substituents consisting of alkyl, alkoxy and halogen, and one for a hydrogen atom or a substituent of the just defined group, and in which $z$ stands for a substituent from a group of substituents consisting of alkyl and alkoxy, which products are red to dark red powders, dissolve in liquid chlorinated aromatic hydrocarbons to red solutions, and yield vivid scarlet red to blue red tints when produced on the fibre, which combine purity with an excellent fastness to chlorine, keir-boiling and light.

6. As a new product the azo-dyestuff of the formula

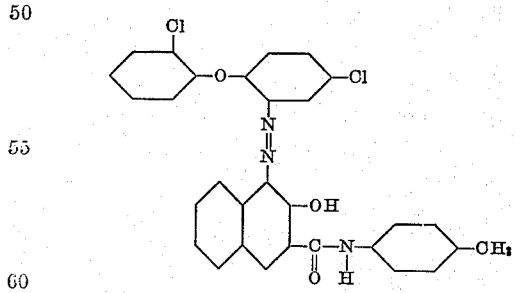

which product is a red powder, dissolves in chlorobenzene to a scarlet red solution, and yields, when produced on the fibre, vivid pure scarlet red tints of an excellent fastness to chlorine, keir-boiling and light.

7. As a new product the azo-dyestuff of the formula

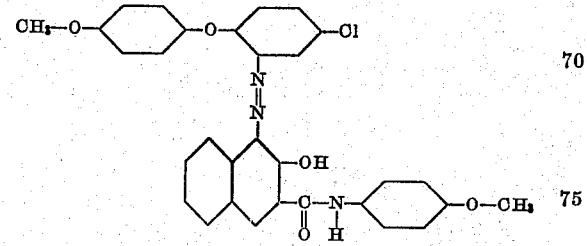

which product is a red powder, dissolves in chlorobenzene to a blue red solution, and yields, when produced on the fibre, vivid pure blue red tints of an excellent fastness to chlorine, keir-boiling and light.

In witness whereof, I have hereunto signed my name this 17th day of October, 1931.

GÉRALD BONHÔTE.